United States Patent [19]
Boles et al.

[11] Patent Number: 6,016,710
[45] Date of Patent: Jan. 25, 2000

[54] METHOD AND APPARATUS FOR MEASURING THE QUANTITY OF OUTDOOR AIR PROCESSED BY AN AIR PRECONDITIONING MODULE

[75] Inventors: Michael Boles, Hallsville, Mo.; John C. Fischer, Marietta, Ga.

[73] Assignee: Semco Incorporated, Columbia, Mo.

[21] Appl. No.: 09/021,890

[22] Filed: Feb. 11, 1998

[51] Int. Cl.[7] .................................................. G01F 1/34
[52] U.S. Cl. ......................................................... 73/861.42
[58] Field of Search .............................. 62/324.6, 331; 165/248, 249, 279, 281, 284; 73/861.42, 861.65, 714

[56] References Cited

U.S. PATENT DOCUMENTS

| | | | |
|---|---|---|---|
| 3,666,007 | 5/1972 | Yoshino et al. | 165/166 |
| 3,889,742 | 6/1975 | Rush et al. | 165/7 |
| 4,093,435 | 6/1978 | Marron et al. | 55/269 |
| 4,769,053 | 9/1988 | Fischer, Jr. | 55/389 |
| 4,841,733 | 6/1989 | Dussault et al. | 165/249 |
| 5,401,706 | 3/1995 | Fischer, Jr. | 502/401 |
| 5,496,397 | 3/1996 | Fischer et al. | 96/154 |

*Primary Examiner*—William Oen
*Attorney, Agent, or Firm*—Bryan Cave LLP

[57] ABSTRACT

A method and system for determining the airflow through an air preconditioning module having a sensible and/or latent energy transfer matrix having a pre-established relationship between airflow and pressure drop. The air preconditioning module processes an inlet air stream so that it becomes a uniformly distributed (and preferably substantially laminar) outlet air stream leaving the energy transfer matrix of the preconditioning module. The pressure differential between the inlet air stream and the outlet air stream is determined and translated into an airflow value based on the pre-established relationship between airflow and pressure drop through the energy transfer matrix of the air preconditioning module.

54 Claims, 6 Drawing Sheets

METHOD AND APPARATUS FOR MEASURING THE QUANTITY OF OUTDOOR AIR PROCESSED BY AN AIR PRECONDITIONING MODULE

FIELD OF THE INVENTION

The present invention relates generally to air preconditioning modules used in connection with heating, ventilating and air conditioning systems and, more particularly, to methods and devices used to measure, record and document the quantity of outdoor air entering, and exhaust air leaving, a conditioned space through such an air preconditioning module.

BACKGROUND OF THE INVENTION

Major changes have taken place within the heating, ventilating and air-conditioning ("HVAC") industry as a result of new regulations enacted to address certain indoor air quality ("IAQ") problems, which can result in what has been commonly referred to as "sick building syndrome." Several years ago, the American Society of Heating Refrigeration and Air-Conditioning Engineers ("ASHRAE"), the HVAC industry's trade organization, issued a new standard (IAQ Standard 62-1989), which significantly increased the recommended quantity of outdoor air to be drawn in and processed by an HVAC system installed to operate with a commercial facility. Since that time, this standard has been adopted by most major building codes. Currently, ASHRAE is in the process of revising the 62-1989 standard, altering its presentation format and revising and expanding numerous aspects of the standard. Among the most significant changes include new methods for calculating outdoor air quantities (i.e., the amount of outdoor air processed by the HVAC system in a given period of time), requirements for space humidity control, and proof that the required outdoor air quantities are being delivered to the occupied space on a continuous basis.

Most (greater than 75%) of all commercial buildings use packaged heating and air-conditioning equipment. Typically, this equipment consists of a compressor, various fans, filters, dampers, and associated devices. This equipment is easy to install, performs well if used as designed, and is very cost effective. However, the new IAQ requirements presented by ASHRAE tax the ability of such packaged equipment to perform as intended. Such equipment was conventionally designed to process only a relatively small quantity of outdoor air (e.g., approximately 15% of the total air processed, the bulk of the total being re-circulated air). In addition, the system fan is generally operated on an intermittent basis, providing outdoor air to the conditioned space only when the heating or cooling source is energized. In most cases, following the new IAQ requirements results in providing a much higher proportion of outdoor air compared to recirculated air on a continuous basis than was heretofore necessary. If a conventional packaged unit is operated to comply with the outdoor air requirements of the ASHRAE 62-1989 standard, the resulting humidity control within the space is frequently less than desired, especially at partial load conditions.

As is known, a solution to meet the new IAQ requirements is to precondition the outdoor air entering the packaged HVAC units with a device commonly known as an air-to-air energy exchanger. A preferred air-to-air energy exchanger, a total energy recovery wheel, is described in Fischer et al. U.S. Pat. No. 4,769,053 (also assigned to the assignor of the present invention). Using such devices, air that is exhausted from the conditioned space is first passed through an air preconditioning module containing the air-to-air energy exchanger, which typically recovers a high percentage (e.g., up to 80%) of the total energy contained in this exhaust air stream and uses this recovered energy to pre-cool and dehumidify the outdoor air during the cooling season and to preheat and humidify the outdoor air during the heating season. Thus, the addition of an air preconditioning module permits a packaged HVAC unit to process approximately four times more outdoor air on a continuous basis than it otherwise could, thereby allowing the system under the new ASHRAE requirements to maintain indoor temperature and humidity conditions similar to those maintained with the same packaged HVAC unit without the use of an air preconditioning module before the new ASHRAE requirements.

The supply and return air quantities to and from the packaged HVAC units (either standing alone or when used in combination with an air preconditioning module) are easily measured in the duct work extending from the HVAC unit into the conditioned space using conventional methods. One such method, which may be used when the packaged system is initially balanced for airflow, is to use a conventional pitot tube or hot wire anemometer traversing the ductwork. Another common approach is to use an airflow station/hood to determine flow on a register-by-register basis. These procedures are easy to implement and reasonably reliable. However, principally due to space restrictions, these two conventional methods are not easily applicable to the task of measuring the quantity of outdoor air provided to, or exhaust air purged from, the conditioned space served by packaged HVAC equipment. Typical HVAC packaged systems, including those coupled with an air preconditioning module, do not allow adequate access to install and operate conventional airflow measuring devices to quantify the amount of outdoor (or exhaust air) being delivered by the unit. For example, the outdoor air quantity, which is typically set by manually adjusting the inlet hood/damper combination connected to the return air section of the packaged system, cannot readily be measured because the amount of space available for taking such measurements is too small or the inlet velocity too uneven to effectively apply accurate airflow measuring equipment.

Several alternative methods are currently used to estimate the amount of outdoor and exhaust air entering and exiting a conditioned spaced. For example, one such method is to estimate the outdoor airflow by measuring the average velocity of the air into the hood and then multiplying this velocity times the open area of the hood. The error using this approach is considerable, that is, the likelihood that the correct value will be determined a high percentage of the time is low.

Furthermore, measuring the outdoor air quantity on a continuous basis presents additional difficulties and is seldom done with packaged HVAC systems. Although conventional airflow stations are available for this purpose, to apply these stations to a packaged HVAC unit requires an additional plenum to be added to the system, resulting in a significant increase in the cost and size of the HVAC unit. The addition of such a plenum becomes more cumbersome if the system includes an air preconditioning module (as described above) to satisfy the recent IAQ performance requirements imposed on the system.

Thus, there is a continuing need for an efficient, accurate, and cost effective method to measure the amount of outdoor air (i.e., fresh or non-recycled air) delivered to a conditioned space, especially when such outdoor air is processed through an air preconditioning module operating in conjunction with a conventional packaged HVAC unit. Preferably, the method would also provide a means to measure the volume of exhaust air emitted from the conditioned space (i.e., air bled or removed from the system and, for example, exhausted to the outdoors) through the air preconditioning module and a means for continuously recording the volume of outdoor and exhaust air.

SUMMARY OF THE INVENTION

Methods and apparatus for measuring and documenting these outdoor and exhaust air quantities having these features and satisfying these needs have now been developed. The current invention allows for accurate measurement, on a continuous basis, of the outdoor air quantity provided, for example, to a packaged HVAC unit, to multiple HVAC units (of any type), or directly to an occupied space by a stand-alone energy recovery preconditioning module. The present invention also allows for the simultaneous measurement of the amount of exhaust air emitted from a conditioned space. The invention also allows for continuous measurement of these outdoor and exhaust air flows directly at the air preconditioning module via an airflow gauge or manometer or remotely via an electronic signal sent to a central energy management system.

The present invention provides a method for determining the airflow through an air preconditioning module, by processing a turbulent inlet air stream (the incoming airstream will generally be turbulent) through a sensible (temperature) and/or latent (moisture) energy exchanger matrix (in the module) that converts the airflow to a substantially uniform and desireably substantially laminar outlet air stream leaving the energy transfer matrix of the preconditioning module. Preferably, there is a pre-established relationship between airflow and pressure drop through the air preconditioning module. The "inlet air stream" may refer to the outdoor air stream entering the air preconditioning module and processed within the module by the energy transfer matrix into a substantially laminar supply air stream. Additionally, the "inlet air stream" may refer to the return air stream exiting a conditioned space and processed within the air preconditioning module by the energy transfer matrix into a substantially uniform exhaust air stream. As used herein, the "outlet air stream" may refer to the supply air stream exiting the air preconditioning module and entering into the conditioned space or to the exhaust air stream exiting the air preconditioning module and vented to the outdoors.

The preferred method comprises the steps of: (i) feeding an inlet air stream to the air preconditioning module; (ii) processing the inlet air stream so that it exits the energy transfer matrix of the air preconditioning module in a uniform manner and, preferably (e.g., with the preferred fluted energy recovery wheel) as a substantially laminar outlet air stream; (iii) determining the pressure differential between the inlet air stream and the outlet air stream; and (iv) translating the pressure differential into an airflow value based on the pre-established relationship between airflow and pressure drop through the air preconditioning module. In some cases, it may be possible to make the inlet air stream uniformity distributed (and preferably substantially laminar) prior to its entering the energy transfer matrix.

Preferably, the pressure differential is determined with the method of the present invention by using pressure tubing in the inlet and outlet air streams, across the energy transfer matrix (energy recovery wheel in the preferred embodiment), wherein the distal ends of the two pressure tubing lines are connected to a device, such as, for example, a gauge, for determining the pressure differential between the two distal ends. By "tubing," what is meant is any means for conducting the pressure from one point to another, such as, for example, conduit, piping, and/or tubes.

Additionally, the present invention provides a measurement system for determining the airflow through an air preconditioning module. Preferably, the air preconditioning module used in the system has a pre-established relationship between airflow and pressure drop across the energy transfer matrix (e.g., wheel) in the air preconditioning module. Additionally, the system has means for feeding an inlet air stream to the air preconditioning module and means for processing this inlet air stream so that it exits the energy transfer matrix (wheel) in a uniform manner while passing through the air preconditioning module. When using the preferred fluted energy recovery wheel as the energy recovery wheel, the flow is also preferably substantially laminar. The system preferably further comprises means for measuring the pressure differential between the inlet air stream and the uniform (preferably laminar) outlet air stream and means for translating this pressure differential into an airflow value based on the pre-established relationship between airflow and pressure drop across the energy recovery matrix (e.g., wheel) in the air preconditioning module.

BRIEF DESCRIPTION OF THE INVENTION

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 1:
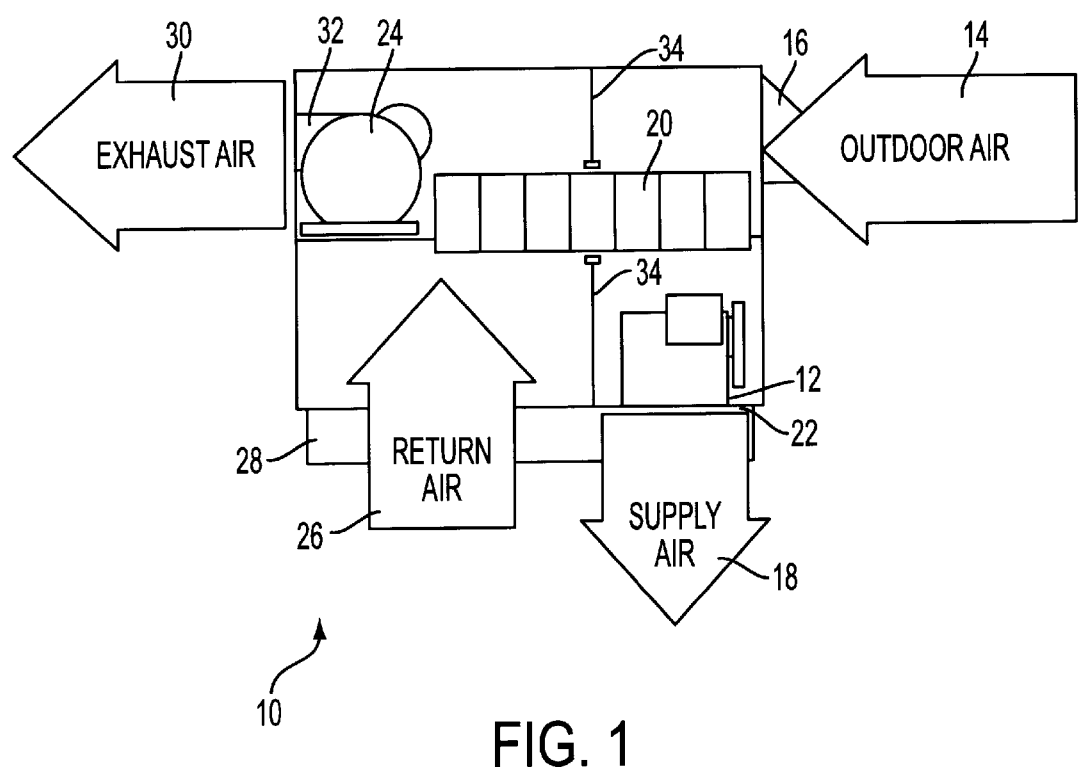
FIG. 1 is a diagrammatic representation of a typical air preconditioning module for use in connection with the present invention.

FIG. 1 illustrates a conventional air preconditioning module 10 used to precondition air supplied ("supply air") directly to a packaged HVAC unit (not shown), which may preferably be used with the method and apparatus of the present invention. Air from the HVAC unit would then be supplied to the conditioned space. Air preconditioning module 10 may be of any conventional type, such as one incorporated into, and sold as part of, a standard HVAC system. Air preconditioning module 10 may also be an add-on unit, either as a retrofit to an existing HVAC system or packaged with a new HVAC system. Air preconditioning module 10 may also be used with other types of HVAC units, or it may be used to provide air directly to a conditioned space. Air preconditioning module 10 includes supply air fan 12, which is used to draw outdoor air (designated as outdoor air stream 14) through outdoor air vent 16, through the inlet side of energy recovery wheel 20. The supply fan then blows the preconditioned supply air (designated as supply air stream 18) directly to the conditioned space or to the return air section of a conventional packaged HVAC unit. Air preconditioning module 10 further comprises exhaust air fan 24, which draws return air (designated as return air stream 26) through a return air vent (not shown), through the outlet side of energy recovery wheel 20, and exhausts such air (designated as exhaust air stream 30) through exhaust air vent 32. Any air leaving the conditioned space that is to be recycled to the space should be recycled within the HVAC unit and not within air preconditioning module 10. Thus, the mass flow rate on a dry basis of exhaust air stream 30 is (except for any minor leakage and purge volume, where applicable) the same as that of return air stream 26 and the mass flow rate on a dry basis of supply air stream 18 is (except for any minor leakage and purge volume, where applicable) the same as that of outdoor air stream 14. Air preconditioning module 10, as is known in the industry, may also comprise other devices as desired such as, for example, filters, various bypass dampers, and controls. Air preconditioning module 10 includes a baffle and seals 34, which separate the outdoor/supply air streams, 14 and 18, from the return/exhaust air streams, 26 and 30, by dividing the interior of housing 11 into two plenums.

Air preconditioning module 10 further comprises, as its key component, an air-to-air sensible (temperature) and/or latent (humidification or dehumidification) energy transfer matrix, shown in FIG. 1 as energy recovery wheel 20. Although an energy recovery wheel, as described below, is the preferred energy transfer matrix for the present invention, other devices (such as, for example, plates or heat pipes) may also be used with the present invention. These alternative heat exchangers, however, do not provide certain beneficial properties (as discussed below) and, therefore, result in less accurate airflow measurements.

Preferably, energy recovery wheel 20 (as described in U.S. Pat. No. 4,769,053) has a sensible and/or latent heat transfer matrix comprising a gas permeable honeycomb matrix. Such energy recovery wheels are designed to remove heat and/or moisture from one air stream and transfer them to another adjacent air stream. The gas permeable matrix contains passageways through which an air stream can flow through to contact the heat exchange material, which is capable of absorbing sensible and/or latent heat and adsorbing moisture from a warm, humid air stream and releasing the absorbed sensible and/or latent heat and moisture into a cool, dry air stream as the air streams flow through the sensible and/or latent heat transfer matrix. Typically, the matrix comprises a desiccant-coated substrate, as described in U.S. Pat. Nos. 5,300,138, 5,401,706, and 5,496,397. All of the documents identified and/or discussed herein, including all of the foregoing documents, are incorporated herein in their entirety for all purposes.

A preferred energy recovery wheel is described in Fischer et al. U.S. Pat. No. 4,769,053, which can use a corrugated substrate to form the passageways. Additionally, energy recovery wheel 20 is preferably mounted within a frame so that wheel 20 is free to rotate. This frame is disposed between the outdoor and exhaust air streams, 14 and 30, and is preferably oriented such that the passageways extend axially (i.e., generally parallel to the axis of rotation of the wheel) through the sensible and latent heat exchange media. Thus, the air streams can flow from one side (or circular face) of the wheel to the other. Typically, the outdoor and exhaust air streams, 14 and 30, flow in opposite directions simultaneously through different portions of energy recovery wheel 20.

When used as contemplated with the present invention, the outdoor and return air streams 14 and 26 pass through the honeycomb matrix of energy recovery wheel 20 in a countercurrent fashion while each segment of wheel 20 is rotated from contacting one air stream (e.g., outdoor) in one of the plenums created by baffle 34 to the other air stream (e.g., return). As air preconditioning module 10 operates, up to 80% of the total energy (enthalpy) differential that exists between the outdoor and return air streams 14 and 26 is recovered and transferred to the outdoor air stream 14, provided the honeycomb matrix contains an adequate quantity of an effective desiccant material and has sufficient heat capacity.

The preferred air preconditioning module 10 has certain properties that are beneficial for accurately measuring airflow using the method of the present invention. For example, the preferred uniform honeycomb configuration of the matrix of wheel 20 causes the air entering the matrix of wheel 20 (outdoor air stream 14), which is generally turbulent and non-uniform and therefore has an uneven velocity and pressure profile, to uniformly distribute through the energy transfer matrix, thereby straightening the airflow, which in turn results in the airflow exiting wheel 20 (designated as supply air stream 18) to have a relatively uniform velocity profile. This ensures an even pressure drop across wheel 20 and makes a pressure differential determined across a single point in the supply air stream 18 an accurate representation of the differential across the entire area of the matrix of wheel 20. Similarly, the honeycomb configuration of the preferred energy transfer matrix of wheel 20 causes the return air stream 26 entering the matrix of the fluted wheel 20 to evenly distribute and straighten, thus ensuring an even pressure drop across wheel 20 for the return/exhaust air streams. As one skilled in the art will recognize, as described below, because the pressure drop across the energy transfer matrix is being measured at only one radial and angular location across (one segment of) the face of the wheel 20, if the air flow rate or flow velocity passing through this location of the wheel 20 is not fairly uniform, thereby representative of the flow rate (or velocity) through the wheel 20 in a given airstream, the pressure drop measured across the wheel matrix will likely result in an inaccurate airflow measurement. Therefore, it is preferred that the air flow rate through the wheel 20 be uniformly distributed. Uniformly distributed means that the airstream velocity through the energy transfer matrix (and thereby the pressure loss across the matrix) is essentially the same, i.e., with an approximate variation in the air stream velocity across the entire face of the energy recovery matrix positioned in the air stream being measured of not more than about +/−20%, usually about +/−15%, desirably less than +/−10% and, preferably less than +/−5%.

Figure 2:
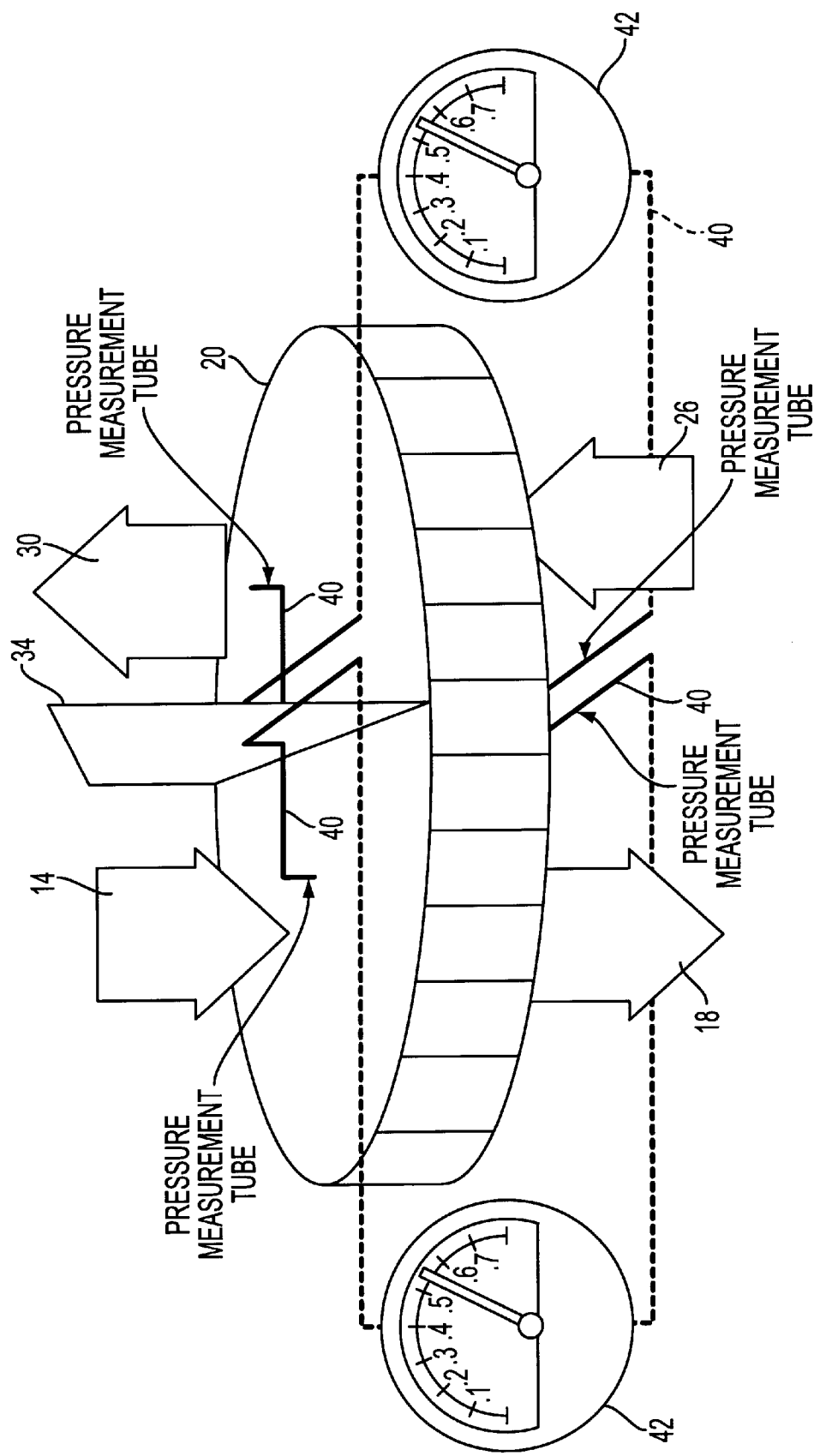
FIG. 2 is a perspective view of a typical energy recovery wheel that may be used in the module of FIG. 1 illustrating the placement of pressure tubes for use in connection with the present invention.

Additionally, because of the hydraulic diameter of the preferred matrix of wheel 20 (i.e., the diameter of the cross-sectional area of the flutes of the matrix (as shown in FIG. 2 of U.S. Pat. No. 4,769,053)), and the range of air stream velocities typically encountered, the flow profile through the uniform honeycomb matrix of wheel 20 is substantially laminar and remains laminar over a wide range of face velocities that exist in typical applications (i.e., 200 to 1200 ft/min). As used herein, "substantially laminar" means a nearly linear relationship between the flow rate through the preferred energy recovery wheel 20 and the pressure drop across the wheel 20. Laminar airflow through the recovery wheel matrix is beneficial in the present invention because with laminar flow the resultant pressure drop across wheel 20 has a linear relationship to the velocity of the air through the wheel. As important, the laminar flow also provides a uniformly distributed airflow across the recovery wheel matrix, with the benefits noted above. These characteristics allow one to directly and simply correlate airflow with pressure drop, which in turn allows accurate direct readout of flow from the pressure differential (e.g., using a pressure gauge). That could not be easily accomplished if the flow were instead non-laminar (i.e., turbulent).

Separate and apart from these benefits, the laminar flow of air exiting wheel 20, when combined with the repeated reversal of airflow through each wheel segment as each segment moves from one plenum to the other, is known by those skilled in the art to prevent plugging of the wheel. Plugging would likely cause increased pressure drop, thereby falsely indicating increased airflow when in fact airflow was actually being reduced due to the plugging.

In accordance with the method of the present invention, to determine the quantity of outdoor air entering the conditioned space and/or the quantity of exhaust air exiting the conditioned space, the static pressure drop between each of two sets of air streams (i.e., between the outdoor and supply air streams 14 and 18, and between the return and exhaust air streams, 26 and 30), is measured. Because of the uniform nature of the air stream exiting velocity from the wheel (as discussed above), these pressure measurements may generally be taken anywhere in the respective air streams of the air preconditioning module, except directly adjacent to the energy wheel seals (as discussed below). The pressure readings may then be used, because of the linear relationship between pressure drop and airflow, to determine the airflow of each air stream. Then the airflow reading may be used to calculate the volume of outdoor and exhaust air entering and exiting the conditioned space. For example, if the airflow reading is expressed as a volumetric velocity, i.e., the number of cubic feet of air per minute (CFM), then the total volume of outdoor (or exhaust) air entering (or exiting) the conditioned space may be calculated by multiplying the airflow reading by the duration of time the system is operating.

FIG. 2 shows a preferred apparatus for measuring the quantities of outdoor and exhaust air entering and exiting the conditioned space. FIG. 2 shows a portion of an air preconditioning module 10 having an energy recovery wheel 20. Four pressure tubes 40 are secured in place in each of the four air streams, i.e., outdoor air stream 14, supply air stream 18, return air stream 26, and exhaust air stream 30. The pressure tubes 40 may be fabricated from any suitable tubing material such as, for example, plastic or metal. Preferably, the open end of each pressure tube 40 is secured in the respective air stream such that the pressure reading is taken in front of the face of the transfer matrix of wheel 20. It is preferable that the opening of pressure tubes 40 be pointed perpendicular to or in the direction of airflow (i.e., not facing into the direction of airflow) of each air stream being measured so that the velocity pressure of the air stream does not increase the total static pressure reading. A less desirable position is to place the openings of tubes 40 facing upstream (into) the direction of airflow. Such a configuration provides a total pressure reading, but there exist certain difficulties associated with positioning the tube facing into the direction of airflow in order to provide a consistent, accurate reading.

Preferably, the open ends of pressure tubes 40 are round and smooth (without burrs or rough edges) and have a diameter of approximately 1/16 inch to 3/8 inch, although smaller and larger tubes may also work. When using the preferred air preconditioning module 10 having wheel 20, pressure tubes 40 should not be located near the air seals of baffle 34 that separates the various air streams, because the pressure near these air seals has been shown though testing to occasionally reflect a pressure value representing an average of the two air streams across the seals and not that of the air stream entering or leaving the face of wheel 20. With this exception, the open ends of pressure tubes 40 may be placed anywhere in the various air streams. The open end of each pressure tube 40 is preferably positioned approximately 1 to 4 inches off the heat exchanger surface. In the case of the energy recovery wheel, the tube openings should preferably be positioned half way between the shaft and outer perimeter of the energy wheel (i.e., centered over the face of the wheel in a given airstream) so as to be positioned away from the energy wheel seals and the inlet of the fans (if fans are used in the air preconditioning module).

The distal ends of the two pressure tubes 40 inserted into the outdoor and supply air streams 14 and 18 are connected to a conventional meter 42 (as described below) to measure the pressure loss of the outdoor air flowing through wheel 20 of air preconditioning module 10. Likewise, the distal ends of the two pressure tubes 40 inserted into the return and exhaust air streams 26 and 30 are connected to a second meter 42, which measures the pressure loss of the exhaust air flowing though wheel 20.

A first method for measuring the amount of outdoor air entering a conditioned space through air preconditioning module 20 involves the use of a conventional diaphragm gauge as meter 42. Preferably, the diaphragm gauge is connected between pressure measurement tubes 40 set within the outdoor and supply air streams 14 and 18. The gauge provides a pressure loss reading between the outdoor and supply air streams 14 and 18, which may then be used to determine the airflow through the left (FIG. 2) side of the wheel directly from a conventional airflow chart (which is designed specifically for a given air preconditioning module). Alternatively, as is known, a diaphragm gauge having the ability to read and display cubic feet per minute ("CFM") directly in lieu of pressure loss may be used as meter 42. This first method may similarly be used to measure the amount of exhaust air exiting a conditioned space via an air preconditioning module. Thus, a conventional diaphragm gauge or manometer may be positioned between pressure measurement tubes 40 placed in the return and exhaust air streams 26 and 30 to determine the pressure drop between the return and exhaust air streams and thus the airflow through the right side of the wheel (FIG. 2).

A second method for measuring the amount of outdoor air entering a conditioned space through an air preconditioning module allows the measurement to be remotely recorded. Preferably, a pressure transducer is connected to each pair of pressure measurement tubes 40, which transducer converts the pressure loss measured across the wheel to an electronic signal that can be transmitted (either continuously or intermittently) to a central control or energy management system or a display located adjacent to, or remote from, the air preconditioning module 10. The central control or energy management system may then report the airflow value represented by the electric signal either continuously or, by storing and averaging a number of signals over a period of time, over that period (i.e., intermittently).

Additionally, when measuring the outdoor and/or exhaust air flows (either locally or remotely), audible and/or visual signals may be integrated into the measurement system to provide an alarm when certain conditions arise. For example, a pressure limit switch that engages an electrical contact when a minimum pre-set pressure threshold is not achieved may be incorporated into the present invention. This alerts building managers to a condition of lower than desired outdoor air quantities due to conditions such as loaded filters, fan failure, frost formation on the wheel, etc.

Accurate and timely measurement of outdoor and exhaust air volumes results in certain advantages, including assurance of the desired ventilation volume. This is particularly important for variable volume systems, where the reduction of outdoor air brought into the system as the supply air flow to the conditioned space is varied has been noted as a major contributor to indoor air quality problems. Accurate monitoring of outdoor and exhaust air flows can also assist in highlighting important maintenance issues, such as the need for replacing filters and the need to address certain operational issues such as frost formation on the heat exchangers in extreme climates. The airflow measurements derived using the method and apparatus of the present invention are easily made by, for example, the contractor at the time the HVAC system is initially installed.

As is known, air preconditioning modules utilizing an energy recovery wheel will often direct a small quantity of outdoor air through the wheel into the exhaust air section as the wheel is rotated from the exhaust air stream to the outdoor air stream, thus purging any carryover of contaminants from the exhaust air stream. The present invention will operate effectively in systems incorporating this purge feature because only the amount of outdoor air transmitted through the wheel and into the HVAC equipment (or conditioned space) is measured. When the present invention is used to measure the amount of exhaust air leaving an HVAC unit through an energy recover module having a purge feature, the volume of purge air must be reflected in such measurements. For example, the chart used to translate pressure loss to airflow may be modified to account for this purge volume. Alternatively, if a pressure gauge is used, the gauge may be pre-set to account for this.

Figure 3:
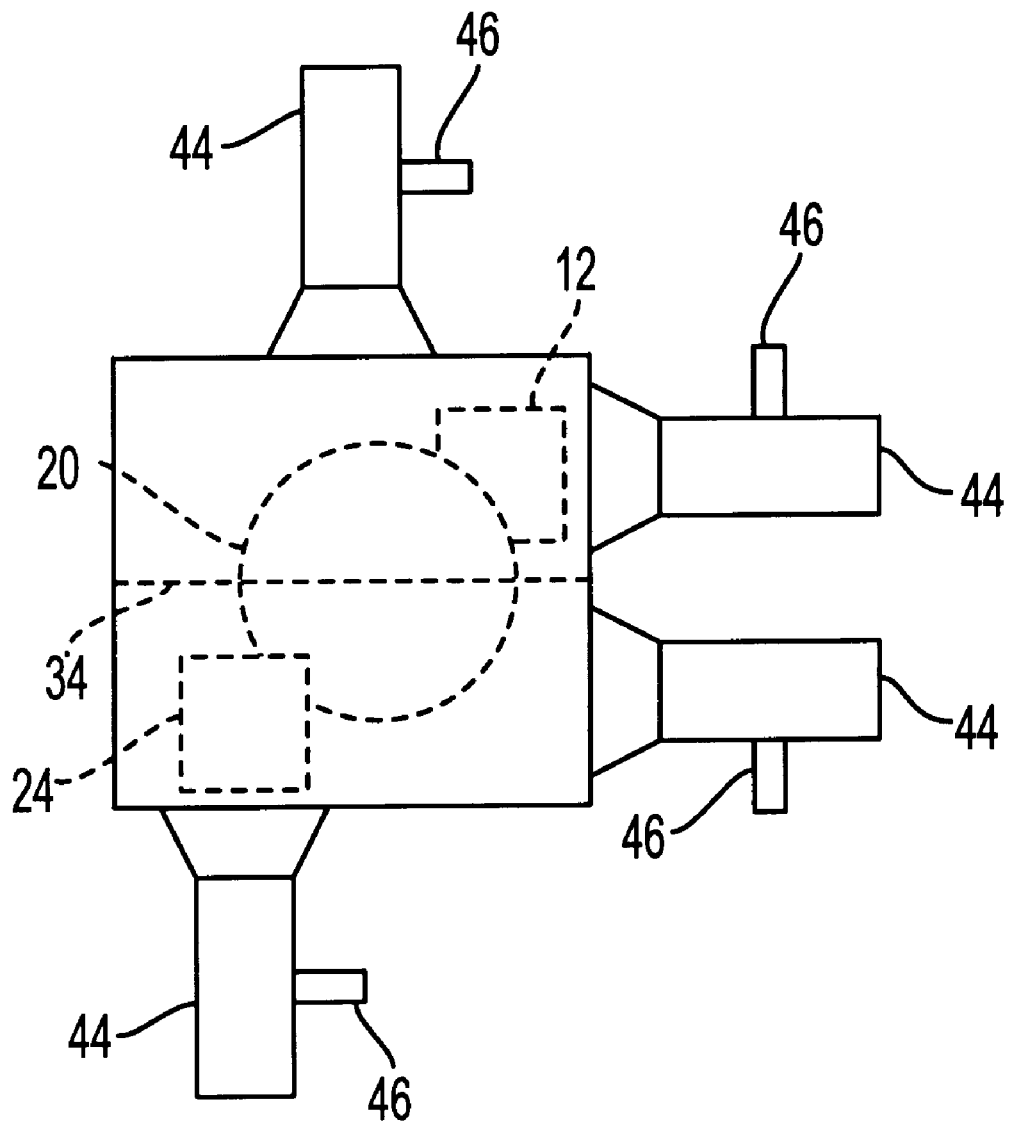
FIG. 3 is a diagrammatic representation of the air preconditioning module of FIG. 1 showing four airflow stations connected thereto.

In order to evaluate the performance of the present invention, an air preconditioning module was designed and fabricated to accommodate an airflow range between approximately 200 and 1200 CFM and to be attached to a conventional 3-ton packaged rooftop HVAC unit. The air preconditioning module illustrated in FIG. 1 is representative of the model FV-1000 total air preconditioning module manufactured by SEMCO, Inc., used for this evaluation. The total energy recovery wheel included in this module had a diameter of 24 inches and was constructed with corrugations having a hydraulic diameter of approximately 1.4 millimeters. Initially, airflow amounts for a stand-alone air preconditioning module were measured as follows. As shown in FIG. 3, round ducts 44 of suitable length (for example six feet each) were transitioned, connected, and tightly sealed to each of the four inlet/outlet locations of the air preconditioning module, namely, outdoor, supply, return, and exhaust, to accurately measure the amount of airflow at each location. In each duct 44, an airflow station 46, such as model FE-1000 manufactured by Paragon Controls, having a rated accuracy of +/−3%, was installed at the optimum point along the duct 44 (6–8 duct diameters from the transition to the recovery model). A pressure gauge (an Air Data Multimeter model ADM-860, manufactured by Shortridge Instruments, having an accuracy of +/−2%) was installed in each airflow station 46. The pressure gauges were used to accurately measure the pressure loss across each airflow station as well as the pressure loss across the energy recovery wheel. Flow readings obtained using the Paragon Controls flow stations were compared against measurements obtained using a Duct Air Monitor Device™ manufactured by Air Monitor Corporation (model LSV4–36 model C for a 9-inch duct) as well as measurements obtained using a conventional pitot tube traverse. In all cases, the readings obtained using the Paragon Controls airflow stations were found to be in agreement with those obtained using the two conventional methods (i.e., using the pitot tube traverse and the pressure gauges and using the air monitor) and, thus, provided a baseline from which to accurately test the present invention.

Next, a stand-alone air preconditioning module was tested to correlate the airflow quantities to and from the module with the static pressure loss across the recovery wheel. In accordance with the present invention, four pressure tubes 40 were installed in an air preconditioning module 10 and the tubing of the pressure tubes 40 was run from the inside to the outside of module 10, allowing the pressure in all four sections of the air preconditioning module 10 to be read while the module 10 was operating (i.e., the wheel rotating and the outdoor and exhaust air fans operating). Using this configuration, the pressure loss across the recovery wheel between the outdoor and supply air streams 14 and 18 and the return and exhaust air streams 26 and 30 could be measured using the installed pressure tubes and the Shortridge instrument.

Next, round ducts 44 having dampers located within the ductwork were attached to each of the four airflow outlets: outdoor, supply, return, and exhaust. Using this configuration, the air preconditioning module 10 was operated as a stand-alone unit, and the pressure in the ducts 44 was varied using the dampers to alter airflow. As the airflow was adjusted, a corresponding pressure loss across each half of the wheel was noted and measured.

Figure 4:
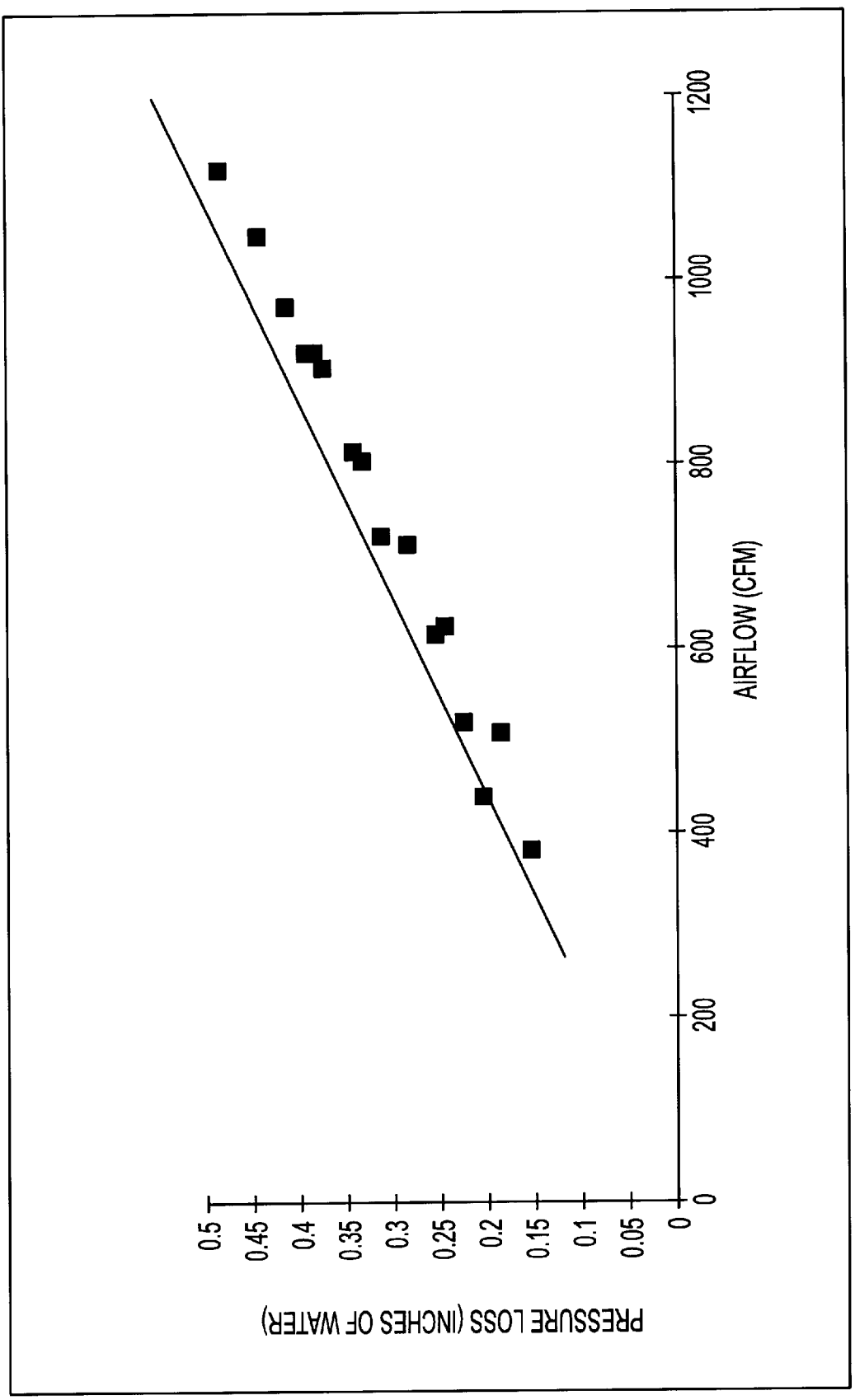
FIG. 4 is a graph of the measured airflow of the supply air stream as a function of pressure loss across the preferred fluted energy recovery wheel of both a stand-alone air preconditioning module and an air preconditioning module connected to a packaged HVAC unit, as measured using the method and apparatus of the present invention and verified by calibrated airflow stations as shown by FIG. 3.
Figure 5:
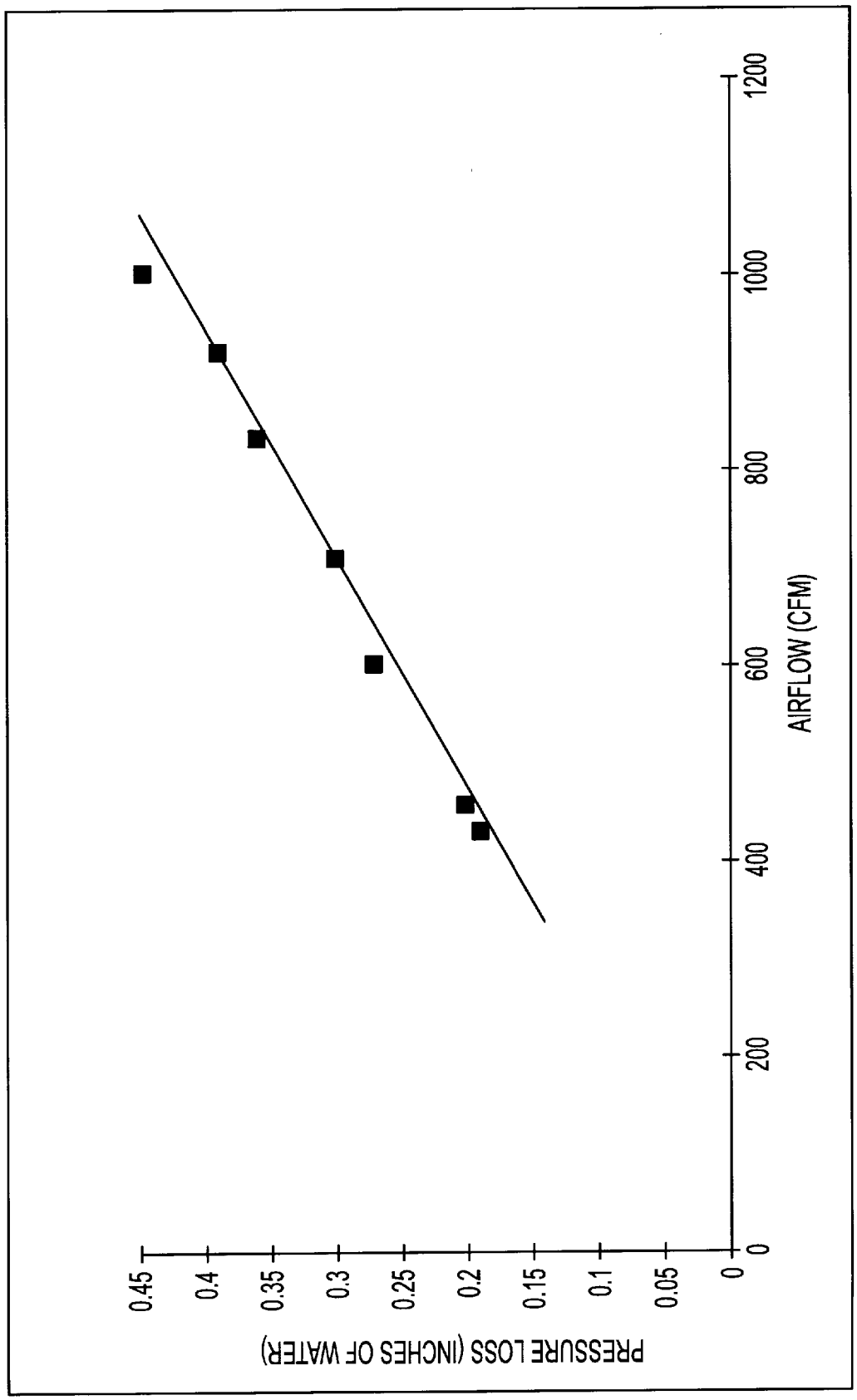
FIG. 5 is a graph of the measured airflow of the exhaust air stream as a function of pressure loss across an energy recovery wheel of an air preconditioning module connected to a conventional HVAC unit, as measured using the method and apparatus of the present invention.

FIGS. 4 and 5 illustrate a sample of the data collected. FIG. 4 is a graph of the airflow (measured in CFM) of the supply air stream as a function of the pressure loss (measured in 0.001 inches of water) across the energy recovery wheel from the outdoor air stream to the supply air stream. Similarly, FIG. 5 depicts the relationship between airflow of the return air stream and the corresponding pressure drop across the energy recovery wheel between the return and exhaust air streams. These graphs (FIGS. 4 and 5) illustrate the nearly linear relationship between airflow volume and pressure loss of a stream of air flowing across a properly configured air preconditioning module and demonstrate that by measuring the pressure loss across the outdoor/supply air streams, the volume of outdoor air processed through the air preconditioning module may be easily and accurately determined. For example, for a given outdoor air stream processed by a preferred air preconditioning module resulting in a pressure drop of 0.25 inches of water across the wheel of the module, the volumetric velocity of such outdoor air would be approximately 600 cubic feet of air per minute (cfm).

This stand-alone recovery module testing was repeated numerous times and the results were consistent—the average deviation over the flow ranges used in most applications (i.e., 300 to 1000 ft./min.) was only approximately 5%. This accuracy is considered acceptable for a pitot tube traverse of large duct systems having ideal conditions and is superior to any estimate that could otherwise be made in an outdoor air intake hood of a conventional packaged HVAC rooftop unit.

Figure 6:
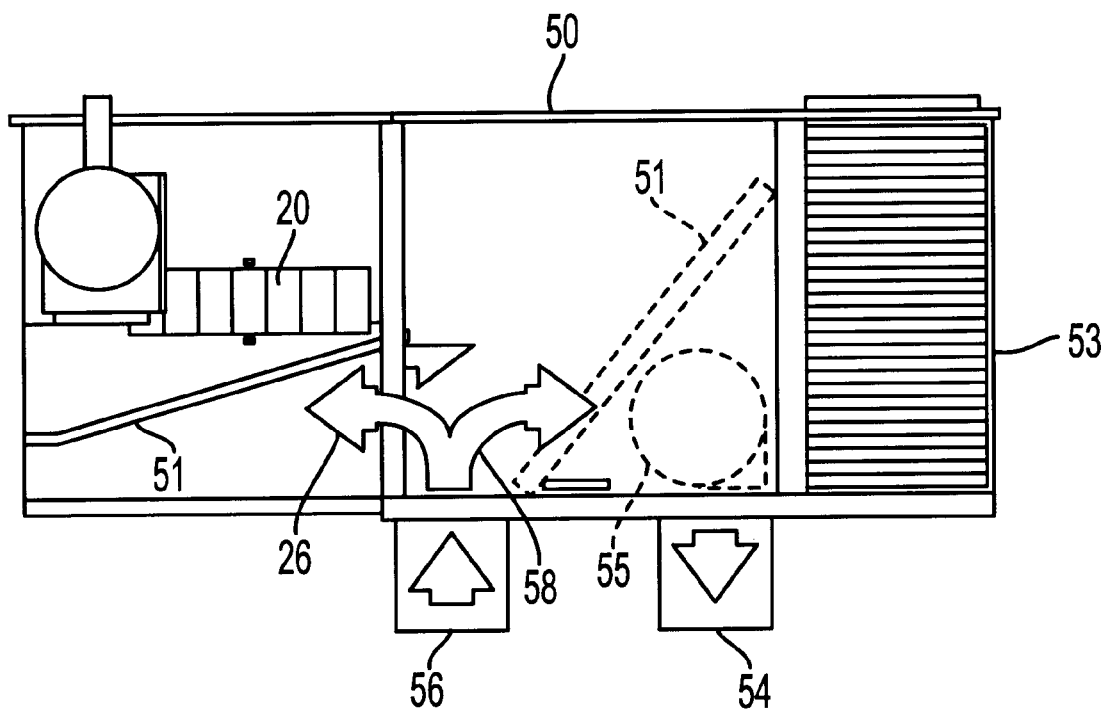
FIG. 6 is a diagrammatic representation of a packaged HVAC unit having an air preconditioning module mounted thereon.

Next, an air preconditioning module 10 was mounted to a conventional 3-ton packaged HVAC unit 50, such as a model YCD036C3LOAA, manufactured by Trane, as shown in FIG. 6. HVAC unit 50 comprises filter 51, condenser 53, and fan 55. In this configuration, duct work was attached to the supply air sections 54 and return air sections 56 of packaged HVAC unit 50. Using the present invention, the airflow to and from the air preconditioning module 20 was measured using the method outlined for the stand-alone module testing (pressure loss across the recovery wheel media). The airflow quantities measured in this fashion were compared to actual flow measurements taken of the outdoor and exhaust air (items 14 and 30 of FIG. 1) to and from the energy recovery module as well as of the supply and return air (items 54 and 56 of FIG. 6) to and from the packaged HVAC unit. By comparing the airflow quantities measured at these four locations, the air supply and return air (items 18 and 26 of FIG. 1) to and from the air preconditioning module are known. The results across a wide variety of wheel face velocities showed good agreement between the two measurement methods, confirming that the present method provides a reliable, accurate method to measure outdoor and exhaust air flows for not only a standalone air preconditioning module but also for an air preconditioning module mounted to a packaged HVAC unit.

Although the present invention has been described in considerable detail with reference to certain presently preferred embodiments thereof, other embodiments are possible without departing from the spirit and scope of the present invention. Therefore the appended claims should not be limited to the description of the preferred versions contained herein.

We claim:

1. A method for determining the airflow through an air preconditioning module having a sensible and/or latent energy transfer matrix in which there is a pre-established relationship between the airflow through the matrix and the pressure drop across the matrix, the air preconditioning module having a first means for processing an inlet air stream so that it becomes a uniformly distributed and substantially laminar outlet air stream, said method comprising the steps of:

(a) feeding an inlet air stream through the air preconditioning module;
    (b) processing the inlet air stream using the first means so that the inlet air stream becomes a uniformly distributed and substantially laminar outlet air stream exiting the energy transfer matrix of the preconditioning module;
    (c) determining the pressure differential between the inlet air stream and the outlet air stream; and
    (d) translating the pressure differential into an airflow value based on the pre-established relationship between airflow through and pressure drop across the energy transfer matrix of the air preconditioning module.

2. The method of claim 1 wherein the air preconditioning module has been installed as part of an air handling system for a space and the pre-established relationship between airflow and pressure drop is determined prior to the installation.

3. The method of claim 1 wherein the pressure differential is determined using first pressure tubing having an open proximate end in the inlet air stream and second pressure tubing having an open proximate end in the outlet air stream, each of the first and second pressure tubing having a distal end, the distal ends of the first and second pressure tubing being connected to a device for determining the pressure differential between the two distal ends.

4. The method of claim 3 wherein the open proximate ends of the first and second pressure tubing are aligned perpendicular to the direction of the airflow in the inlet and outlet air streams, respectively.

5. The method of claim 3 wherein the open proximate ends of the first and second pressure tubing are aligned parallel with the direction of the airflow in the inlet and outlet air streams, respectively.

6. The method of claim 5 wherein the open proximate ends of the first and second pressure tubing are facing in the direction of the airflow in the inlet and outlet air streams, respectively.

7. The method of claim 3 wherein the device for determining the pressure differential indicates the volumetric flow rate through the air preconditioning module.

8. The method of claim 3 wherein the device for determining the pressure differential is a diaphragm gauge or manometer.

9. The method of claim 3 wherein the device for determining the pressure differential comprises a pressure transducer and the distal ends of the first and second pressure tubing are connected to the pressure transducer.

10. The method of claim 3 further comprising the steps of converting the pressure differential to an electronic signal and transmitting the electronic signal to a building HVAC management system or display remote from the air preconditioning module.

11. The method of claim 10 further comprising the step of indicating if the airflow through the air preconditioning module falls below a predefined threshold value.

12. The method of claim 10 where the steps of determining and converting the pressure differential and transmitting the electronic signal are performed continuously while the air preconditioning module is in operation.

13. The method of claim 10 where the steps of determining and converting the pressure differential and transmitting the electronic signal are performed intermittently while the air preconditioning module is in operation.

14. The method of claim 12 further comprising the step of continuously reporting the airflow value represented by the electric signal.

15. The method of claim 12 further comprising the steps of averaging the electronic signals over a period of time and reporting the airflow value represented by the averaged electric signal.

16. The method of claim 1 wherein the pre-established relationship between airflow and pressure drop through the air preconditioning module is essentially linear.

17. The method of claim 1 wherein the matrix of the air preconditioning module comprises an energy recovery wheel having a sensible and latent energy exchange media capable of removing heat and moisture from the inlet air stream and the wheel comprises the first means for processing the inlet air stream so that it becomes the uniformly distributed and substantially laminar outlet air stream.

18. A method for determining the quantity of outdoor air delivered to a conditioned space in which the outdoor air passes through an air preconditioning module having a sensible and/or latent energy transfer matrix and becomes a supply air stream before entering the conditioned space and in which there is a pre-established relationship between airflow through the matrix and pressure drop across the matrix, the air preconditioning module having a first means for processing an outdoor air stream so that it becomes a uniformly distributed and substantially laminar supply air stream, said method comprising the steps of:

(a) feeding an outdoor air stream through the air preconditioning module;

(b) processing the outdoor air stream using the first means so that the outdoor air stream becomes a uniformly distributed and substantially laminar supply air stream exiting the energy transfer matrix of the preconditioning module;

(c) determining the pressure differential between the outdoor air stream and the supply air stream; and (d) translating the pressure differential into an airflow value based on the pre-established relationship between airflow through and pressure drop across the matrix of the air preconditioning module.

19. The method of claim 18 wherein the air preconditioning module has been installed as part of an air handling system for the conditioned space and the pre-established relationship between airflow and pressure drop is determined prior to the installation.

20. The method of claim 18 wherein the pressure differential is determined using first pressure tubing having an open proximate end in the outdoor air stream and second pressure tubing having an open proximate end in the supply air stream, each of the first and second pressure tubing having a distal end, the distal ends of the first and second pressure tubing being connected to a device for determining the pressure differential between the two distal ends.

21. The method of claim 20 wherein the open proximate ends of the first and second pressure tubing are aligned perpendicular to the direction of the airflow in the outdoor and supply air streams, respectively.

22. The method of claim 20 wherein the open proximate ends of the first and second pressure tubing are aligned parallel with the direction of the airflow in the outdoor and supply air streams, respectively.

23. The method of claim 20 wherein the open proximate ends of the first and second pressure tubing are facing in the direction of the airflow in the outdoor and supply air streams, respectively.

24. The method of claim 20 wherein the device for determining the pressure differential indicates the volume of airflow through the air preconditioning module.

25. The method of claim 20 wherein the device for determining the pressure differential is a diaphragm gauge or manometer.

26. The method of claim 20 wherein the device for determining the pressure differential comprises a pressure transducer and the distal ends of the first and second pressure tubing are connected to the pressure transducer.

27. The method of claim 20 further comprising the steps of converting the pressure differential to an electronic signal and transmitting the electronic signal to a building HVAC management system or display mounted remote from the air preconditioning module.

28. The method of claim 27 further comprising the step of indicating if the airflow through the air preconditioning module falls below a predefined threshold value.

29. The method of claim 27 where the steps of determining and converting the pressure differential and transmitting the electronic signal are performed continuously while the air preconditioning module is in operation.

30. The method of claim 27 where the steps of determining and converting the pressure differential and transmitting the electronic signal are performed intermittently while the air preconditioning module is in operation.

31. The method of claim 29 further comprising the step of continuously reporting the airflow value represented by the electric signal.

32. The method of claim 29 further comprising the steps of averaging the electronic signals over a period of time and reporting the airflow value represented by the averaged electric signal.

33. The method of claim 18 wherein the pre-established relationship between airflow and pressure drop through the air preconditioning module is essentially linear.

34. The method of claim 18 wherein the matrix of the air preconditioning module comprises an energy recovery wheel having a sensible and latent energy exchange media capable of removing heat and moisture from the outdoor air stream and the wheel comprises the first means for processing the outdoor air stream so that it becomes the substantially laminar supply air stream.

35. A method for determining the quantity of return air exiting a conditioned space in which the return air passes through an air preconditioning module having a sensible and/or latent energy transfer matrix and becomes an exhaust air stream discharged from the conditioned space and in which there is a pre-established relationship between airflow through the matrix and pressure drop across the matrix, the air preconditioning module having a first means for processing the return air stream so that it becomes a uniformly distributed and substantially laminar exhaust air stream, said method comprising the steps of:

(a) feeding a return air stream through the air preconditioning module;

(b) processing the return air stream in the air preconditioning module using the first means so that the return air stream becomes a uniformly distributed and substantially laminar exhaust air stream exiting the matrix of the preconditioning module;

(c) determining the pressure differential between the return air stream and the exhaust air stream; and (d) translating the pressure differential into an airflow value based on the pre-established relationship between airflow through and pressure drop across the matrix of the air preconditioning module.

36. The method of claim 35 wherein the air preconditioning module has been installed as part of an air handling system for the conditioned space and the pre-established relationship between airflow and pressure drop is determined prior to the installation.

37. The method of claim 35 wherein the pressure differential is determined using first pressure tubing having an open proximate end in the return air stream and second pressure tubing having an open proximate end in the exhaust air stream, each of the first and second pressure tubing having a distal end, the distal ends of the first and second pressure tubing being connected to a device for determining the pressure differential between the two distal ends.

38. The method of claim 37 wherein the open proximate ends of the first and second pressure tubing are aligned perpendicular to the direction of the airflow in the return and exhaust air streams, respectively.

39. The method of claim 37 wherein the open proximate ends of the first and second pressure tubing are aligned parallel with the direction of the airflow in the return and exhaust air streams, respectively.

40. The method of claim 37 wherein the open proximate ends of the first and second pressure tubing are facing in the direction of the airflow in the return and exhaust air streams, respectively.

41. The method of claim 37 wherein the device for determining the pressure differential indicates the volume of airflow through the air preconditioning module.

42. The method of claim 37 wherein the device for determining the pressure differential is a diaphragm gauge or manometer.

43. The method of claim 37 wherein the device for determining the pressure differential comprises a pressure transducer and the distal ends of the first and second pressure tubing are connected to the pressure transducer.

44. The method of claim 37 further comprising the steps of converting the pressure differential to an electronic signal and transmitting the electronic signal to a building HVAC management system or display remote from the air preconditioning module.

45. The method of claim 44 further comprising the step of indicating if the airflow through the air preconditioning module falls below a predefined threshold value.

46. The method of claim 44 where the steps of determining and converting the pressure differential and transmitting the electronic signal are performed continuously while the air preconditioning module is in operation.

47. The method of claim 44 where the steps of determining and converting the pressure differential and transmitting the electronic signal are performed intermittently while the air preconditioning module is in operation.

48. The method of claim 46 further comprising the step of continuously reporting the airflow value represented by the electric signal.

49. The method of claim 46 further comprising the steps of averaging the electronic signals over a period of time and reporting the airflow value represented by the averaged electric signal.

50. The method of claim 35 wherein the pre-established relationship between airflow and pressure drop through the air preconditioning module is essentially linear.

51. The method of claim 35 wherein the matrix of the air preconditioning module comprises an energy recovery wheel having a sensible and latent heat exchange media capable of releasing absorbed sensible and latent heat and moisture into the return air stream and the wheel comprises the first means for processing the return air stream so that it becomes the substantially laminar exhaust air stream.

52. A system for determining the airflow through an air preconditioning module having a sensible and/or latent energy transfer matrix in which there is a pre-established relationship between the airflow through and pressure drop across the matrix, said system comprising;

(a) means for feeding an inlet air stream to the air preconditioning module;

(b) means for processing the inlet air stream so that it becomes a uniformly distributed and substantially laminar outlet air stream while passing through the matrix of the air preconditioning module;

(c) means for measuring pressure differential between the inlet air stream and the outlet air stream; and (d) means for translating the pressure differential into an airflow value based on the pre-established relationship between airflow through and pressure drop across the matrix of the air preconditioning module.

53. The system of claim 52 wherein the means for processing the inlet air stream comprises an energy recovery wheel having a sensible and latent heat exchange media capable of removing heat and moisture from the inlet air stream flowing through the air preconditioning module.

54. The system of claim 52 wherein the means for processing the inlet air stream comprises an energy recovery wheel having a sensible and latent heat exchange media capable of releasing absorbed sensible and latent heat and moisture into the outlet air stream flowing through the air preconditioning module.

* * * * *